US010394316B2

(12) United States Patent
Todeschini

(10) Patent No.: US 10,394,316 B2
(45) Date of Patent: Aug. 27, 2019

(54) MULTIPLE DISPLAY MODES ON A MOBILE DEVICE

(71) Applicant: Hand Held Products, Inc., Fort Mill, SC (US)

(72) Inventor: Erik Todeschini, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 226 days.

(21) Appl. No.: 15/092,662

(22) Filed: Apr. 7, 2016

(65) Prior Publication Data

US 2017/0293352 A1  Oct. 12, 2017

(51) Int. Cl.
*G06F 3/01* (2006.01)
*G06F 3/0482* (2013.01)

(52) U.S. Cl.
CPC ............ *G06F 3/013* (2013.01); *G06F 3/0482* (2013.01)

(58) Field of Classification Search
CPC ......... G06F 3/015; G06F 3/013; G06F 3/0482
See application file for complete search history.

(56) References Cited

U.S. PATENT DOCUMENTS

| | | | |
|---|---|---|---|
| 5,731,805 A * | 3/1998 | Tognazzini | G06F 3/013 345/156 |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,561,143 B1 | 7/2009 | Milekic | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |

(Continued)

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

*Primary Examiner* — Amy M Levy
(74) *Attorney, Agent, or Firm* — Additon, Higgins & Pendleton, P.A.

(57) ABSTRACT

A display control system for controlling visual features on a mobile device, according to one embodiment, includes a display screen disposed on a front side of the mobile device and configured to display at least one user interface element for a user. A front-facing camera disposed on the front side of the mobile device is configured to sense characteristics of the eyes of the user. A processing device processes these characteristics to determine a corresponding point on the display screen where the eyes of the user are directed. A user interface control unit switches the display screen from a regular display mode to a detailed display mode when it is determined that the corresponding point on the display screen where the eyes are directed coincides with a specific user interface element. The detailed display mode includes supplemental information related to the specific user interface element.

20 Claims, 3 Drawing Sheets

(56) References Cited

U.S. PATENT DOCUMENTS

| | | |
|---|---|---|
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,913,004 B1 * | 12/2014 | Bozarth ............ G06K 9/00604 |
| | | 345/156 |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |

(56) References Cited

U.S. PATENT DOCUMENTS

| | | |
|---|---|---|
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| 9,077,788 B2 | 5/2015 | Nahill et al. |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2005/0047629 A1 | 3/2005 | Farrell et al. |
| 2006/0256083 A1* | 11/2006 | Rosenberg ............ G06F 3/013 345/156 |
| 2007/0063048 A1 | 3/2007 | Havens et al. |
| 2007/0194902 A1* | 8/2007 | Blanco ............ G01C 21/365 340/461 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0105486 A1* | 5/2012 | Lankford ............ G06F 3/013 345/661 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0256967 A1* | 10/2012 | Baldwin ............ G06F 3/013 345/684 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002352 A1 | 1/2014 | Jacob et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |

(56) References Cited

U.S. PATENT DOCUMENTS

| | | | |
|---|---|---|---|
| 2014/0131443 A1 | 5/2014 | Smith | |
| 2014/0131444 A1 | 5/2014 | Wang | |
| 2014/0131448 A1 | 5/2014 | Xian et al. | |
| 2014/0133379 A1 | 5/2014 | Wang et al. | |
| 2014/0136208 A1 | 5/2014 | Maltseff et al. | |
| 2014/0140585 A1 | 5/2014 | Wang | |
| 2014/0149432 A1* | 5/2014 | Chilana | G06F 9/4446 707/749 |
| 2014/0151453 A1 | 6/2014 | Meier et al. | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0166755 A1 | 6/2014 | Liu et al. | |
| 2014/0166757 A1 | 6/2014 | Smith | |
| 2014/0166759 A1 | 6/2014 | Liu et al. | |
| 2014/0168787 A1 | 6/2014 | Wang et al. | |
| 2014/0175165 A1 | 6/2014 | Havens et al. | |
| 2014/0175172 A1 | 6/2014 | Jovanovski et al. | |
| 2014/0191644 A1 | 7/2014 | Chaney | |
| 2014/0191913 A1 | 7/2014 | Ge et al. | |
| 2014/0197238 A1 | 7/2014 | Lui et al. | |
| 2014/0197239 A1 | 7/2014 | Havens et al. | |
| 2014/0197304 A1 | 7/2014 | Feng et al. | |
| 2014/0203087 A1 | 7/2014 | Smith et al. | |
| 2014/0204268 A1 | 7/2014 | Grunow et al. | |
| 2014/0214631 A1 | 7/2014 | Hansen | |
| 2014/0217166 A1 | 8/2014 | Berthiaume et al. | |
| 2014/0217180 A1 | 8/2014 | Liu | |
| 2014/0231500 A1 | 8/2014 | Ehrhart et al. | |
| 2014/0232930 A1 | 8/2014 | Anderson | |
| 2014/0247315 A1 | 9/2014 | Marty et al. | |
| 2014/0263493 A1 | 9/2014 | Amurgis et al. | |
| 2014/0263645 A1 | 9/2014 | Smith et al. | |
| 2014/0270196 A1 | 9/2014 | Braho et al. | |
| 2014/0270229 A1 | 9/2014 | Braho | |
| 2014/0278387 A1 | 9/2014 | DiGregorio | |
| 2014/0282210 A1 | 9/2014 | Bianconi | |
| 2014/0284384 A1 | 9/2014 | Lu et al. | |
| 2014/0288933 A1 | 9/2014 | Braho et al. | |
| 2014/0297058 A1 | 10/2014 | Barker et al. | |
| 2014/0299665 A1 | 10/2014 | Barber et al. | |
| 2014/0312121 A1 | 10/2014 | Lu et al. | |
| 2014/0319220 A1 | 10/2014 | Coyle | |
| 2014/0319221 A1 | 10/2014 | Oberpriller et al. | |
| 2014/0326787 A1 | 11/2014 | Barten | |
| 2014/0332590 A1 | 11/2014 | Wang et al. | |
| 2014/0344943 A1 | 11/2014 | Todeschini et al. | |
| 2014/0346233 A1 | 11/2014 | Liu et al. | |
| 2014/0351317 A1 | 11/2014 | Smith et al. | |
| 2014/0353373 A1 | 12/2014 | Van Horn et al. | |
| 2014/0354532 A1* | 12/2014 | Mullins | G06F 3/015 345/156 |
| 2014/0361073 A1 | 12/2014 | Qu et al. | |
| 2014/0361082 A1 | 12/2014 | Xian et al. | |
| 2014/0362184 A1 | 12/2014 | Jovanovski et al. | |
| 2014/0363015 A1 | 12/2014 | Braho | |
| 2014/0369511 A1 | 12/2014 | Sheerin et al. | |
| 2014/0374483 A1 | 12/2014 | Lu | |
| 2014/0374485 A1 | 12/2014 | Xian et al. | |
| 2015/0001301 A1 | 1/2015 | Ouyang | |
| 2015/0001304 A1 | 1/2015 | Todeschini | |
| 2015/0003673 A1 | 1/2015 | Fletcher | |
| 2015/0009338 A1 | 1/2015 | Laffargue et al. | |
| 2015/0009610 A1 | 1/2015 | London et al. | |
| 2015/0014416 A1 | 1/2015 | Kotlarsky et al. | |
| 2015/0021397 A1 | 1/2015 | Rueblinger et al. | |
| 2015/0028102 A1 | 1/2015 | Ren et al. | |
| 2015/0028103 A1 | 1/2015 | Jiang | |
| 2015/0028104 A1 | 1/2015 | Ma et al. | |
| 2015/0029002 A1 | 1/2015 | Yeakley et al. | |
| 2015/0032709 A1 | 1/2015 | Maloy et al. | |
| 2015/0039309 A1 | 2/2015 | Braho et al. | |
| 2015/0040378 A1 | 2/2015 | Saber et al. | |
| 2015/0048168 A1 | 2/2015 | Fritz et al. | |
| 2015/0049347 A1 | 2/2015 | Laffargue et al. | |
| 2015/0051992 A1 | 2/2015 | Smith | |
| 2015/0053766 A1 | 2/2015 | Havens et al. | |
| 2015/0053768 A1 | 2/2015 | Wang et al. | |
| 2015/0053769 A1 | 2/2015 | Thuries et al. | |
| 2015/0062366 A1 | 3/2015 | Liu et al. | |
| 2015/0063215 A1 | 3/2015 | Wang | |
| 2015/0063676 A1 | 3/2015 | Lloyd et al. | |
| 2015/0069130 A1 | 3/2015 | Gannon | |
| 2015/0071818 A1 | 3/2015 | Todeschini | |
| 2015/0083800 A1 | 3/2015 | Li et al. | |
| 2015/0086114 A1 | 3/2015 | Todeschini | |
| 2015/0088522 A1 | 3/2015 | Hendrickson et al. | |
| 2015/0096872 A1 | 4/2015 | Woodburn | |
| 2015/0099557 A1 | 4/2015 | Pettinelli et al. | |
| 2015/0100196 A1 | 4/2015 | Hollifield | |
| 2015/0102109 A1 | 4/2015 | Huck | |
| 2015/0115035 A1 | 4/2015 | Meier et al. | |
| 2015/0127791 A1 | 5/2015 | Kosecki et al. | |
| 2015/0128116 A1 | 5/2015 | Chen et al. | |
| 2015/0129659 A1 | 5/2015 | Feng et al. | |
| 2015/0133047 A1 | 5/2015 | Smith et al. | |
| 2015/0134470 A1 | 5/2015 | Hejl et al. | |
| 2015/0136851 A1 | 5/2015 | Harding et al. | |
| 2015/0136854 A1 | 5/2015 | Lu et al. | |
| 2015/0142492 A1 | 5/2015 | Kumar | |
| 2015/0144692 A1 | 5/2015 | Hejl | |
| 2015/0144698 A1 | 5/2015 | Teng et al. | |
| 2015/0144701 A1 | 5/2015 | Xian et al. | |
| 2015/0149946 A1 | 5/2015 | Benos et al. | |
| 2015/0161429 A1 | 6/2015 | Xian | |
| 2015/0169925 A1 | 6/2015 | Chang et al. | |
| 2015/0169929 A1 | 6/2015 | Williams et al. | |
| 2015/0186703 A1 | 7/2015 | Chen et al. | |
| 2015/0193644 A1 | 7/2015 | Kearney et al. | |
| 2015/0193645 A1 | 7/2015 | Colavito et al. | |
| 2015/0199957 A1 | 7/2015 | Funyak et al. | |
| 2015/0204671 A1 | 7/2015 | Showering | |
| 2015/0210199 A1 | 7/2015 | Payne | |
| 2015/0220753 A1 | 8/2015 | Zhu et al. | |
| 2015/0254485 A1 | 9/2015 | Feng et al. | |
| 2015/0261315 A1* | 9/2015 | Alameh | G06F 3/03 345/156 |
| 2015/0327012 A1 | 11/2015 | Bian et al. | |
| 2016/0014251 A1 | 1/2016 | Hejl | |
| 2016/0040982 A1 | 2/2016 | Li et al. | |
| 2016/0042241 A1 | 2/2016 | Todeschini | |
| 2016/0057230 A1 | 2/2016 | Todeschini et al. | |
| 2016/0109219 A1 | 4/2016 | Ackley et al. | |
| 2016/0109220 A1 | 4/2016 | Laffargue | |
| 2016/0109224 A1 | 4/2016 | Thuries et al. | |
| 2016/0112631 A1 | 4/2016 | Ackley et al. | |
| 2016/0112643 A1 | 4/2016 | Laffargue et al. | |
| 2016/0124516 A1 | 5/2016 | Schoon et al. | |
| 2016/0125217 A1 | 5/2016 | Todeschini | |
| 2016/0125342 A1 | 5/2016 | Miller et al. | |
| 2016/0133253 A1 | 5/2016 | Braho et al. | |
| 2016/0171720 A1 | 6/2016 | Todeschini | |
| 2016/0178479 A1 | 6/2016 | Goldsmith | |
| 2016/0180678 A1 | 6/2016 | Ackley et al. | |
| 2016/0189087 A1 | 6/2016 | Morton et al. | |
| 2016/0125873 A1 | 7/2016 | Braho et al. | |
| 2016/0225012 A1* | 8/2016 | Ha | G06Q 30/0242 |
| 2016/0227912 A1 | 8/2016 | Oberpriller et al. | |
| 2016/0232891 A1 | 8/2016 | Pecorari | |
| 2016/0292477 A1 | 10/2016 | Bidwell | |
| 2016/0294779 A1 | 10/2016 | Yeakley et al. | |
| 2016/0306769 A1 | 10/2016 | Kohtz et al. | |
| 2016/0314276 A1 | 10/2016 | Sewell et al. | |
| 2016/0314294 A1 | 10/2016 | Kubler et al. | |
| 2016/0350977 A1* | 12/2016 | Doronichev | G06T 19/006 |
| 2017/0010677 A1* | 1/2017 | Roh | G06F 3/0488 |
| 2017/0116104 A1* | 4/2017 | Abou Mahmoud | G06F 11/34 |
| 2017/0285737 A1* | 10/2017 | Khalid | G06F 3/013 |

\* cited by examiner

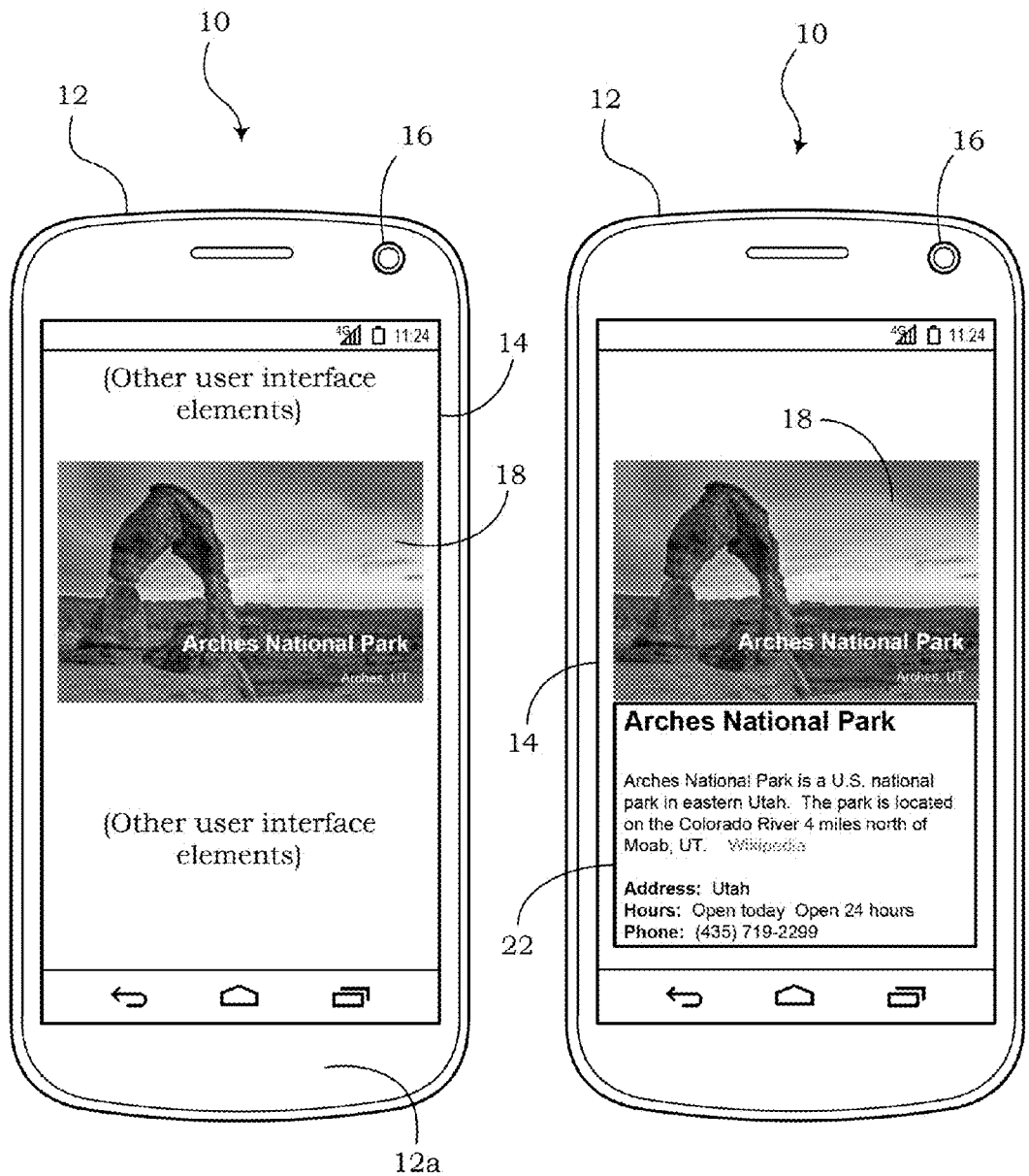

MULTIPLE DISPLAY MODES ON A MOBILE DEVICE

FIELD OF THE INVENTION

The present invention relates to systems and methods for displaying information in multiple display modes on a display screen of a mobile device.

BACKGROUND

Many advances in cellular phone technology have been made over the past several years. One such advance is the technology allowing a user to access Internet websites using a smart phone. A common problem with accessing websites on mobile devices, however, is that the size of the display screens on most smart phones is much smaller than the display screens on computers, laptops, and tablets for which most webpages are typically configured.

Smart phones with small screens may only be able to show just a small portion of a graphical page, such as a webpage, application page, operating system window, etc. The user may then need to scroll up, down, left, and right to see portions of the page a little at a time, which can be frustrating and time-consuming for a user. Alternatively, if the entire large graphical page is displayed on the smart phone screen, this too can be a problem since it can be difficult for the user to see all the minute details on the page.

The issue of adapting a large graphic page to fit into the display area of a small screen often presents a challenge to developers of user interfaces as well. Therefore, a need exists for smart phones to include a user interface that provides graphical content in a manner that is easy for the user to view and is intuitive to the user's intentions.

SUMMARY

Accordingly, in one aspect, the present invention embraces a display control system for controlling visual features on a mobile device. The display control system, in one embodiment, comprises a display screen disposed on a front side of the mobile device. The display screen is configured to display at least one user interface element for a user of the mobile device. The display control system further includes a front-facing camera disposed on the front side of the mobile device. The front-facing camera is configured to sense characteristics of the eyes of the user. Also, the display control system includes a processing device configured to process the characteristics of the eyes of the user to determine a corresponding point on the display screen where the eyes of the user are directed. A user interface control unit of the display control system is configured to switch the display screen from a regular display mode to a detailed display mode when the processing device determines that the corresponding point on the display screen where the eyes of the user are directed coincides with a specific user interface element. The detailed display mode includes supplemental information related to the specific user interface element.

In another exemplary embodiment, a mobile device comprises a body having a front side and a back side. During use of the mobile device, the front side is configured to face in a direction toward a user and the back side is configured to face in a direction away from the user. The mobile device further includes a display device disposed on the front side of the body. The display device is configured to display a plurality of user interface elements simultaneously, wherein each user interface element comprises at least one of an image element and a text element. The mobile device further includes a front-facing camera disposed on the front side of the body. The front-facing camera is configured to capture images of the eyes of the user when the user is viewing the display device. A user interface control unit of the mobile device is configured to receive images of the eyes of the user from the front-facing camera, determine a direction that the eyes of the user are pointed, and determine a corresponding point on the display device where the eyes of the user are directed. The user interface control unit is further configured to control the display device to switch between a regular display mode and a detailed display mode based on whether the corresponding point on the display device where the eyes of the user are directed coincides with one of a plurality of gaze target areas, wherein each gaze target area is associated with a respective user interface element.

In yet another exemplary embodiment, an executable program stored on a non-transitory computer-readable medium disposed in a mobile device is provided. The executable program is executable by a processing device also disposed in the mobile device. The executable program comprises logic configured for processing images of the eyes of a user of the mobile device to determine a corresponding point on a display screen of the mobile device where the eyes of the user are directed. Furthermore, the executable program comprises logic configured for controlling visual features of the display screen based on whether or not the eyes of the user are directed to a user interface element being displayed on the display screen. The user interface element is an image element and/or a text element associated with supplemental information to be displayed in a detailed display mode.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1 schematically depicts a front view of a mobile device displaying a user interface element in a regular display mode, according to an embodiment of the present invention.

FIG. 2 schematically depicts a front view of the mobile device of FIG. 1 displaying the user interface element in a detailed display mode, according to an embodiment of the present invention.

DETAILED DESCRIPTION

Figure 3:
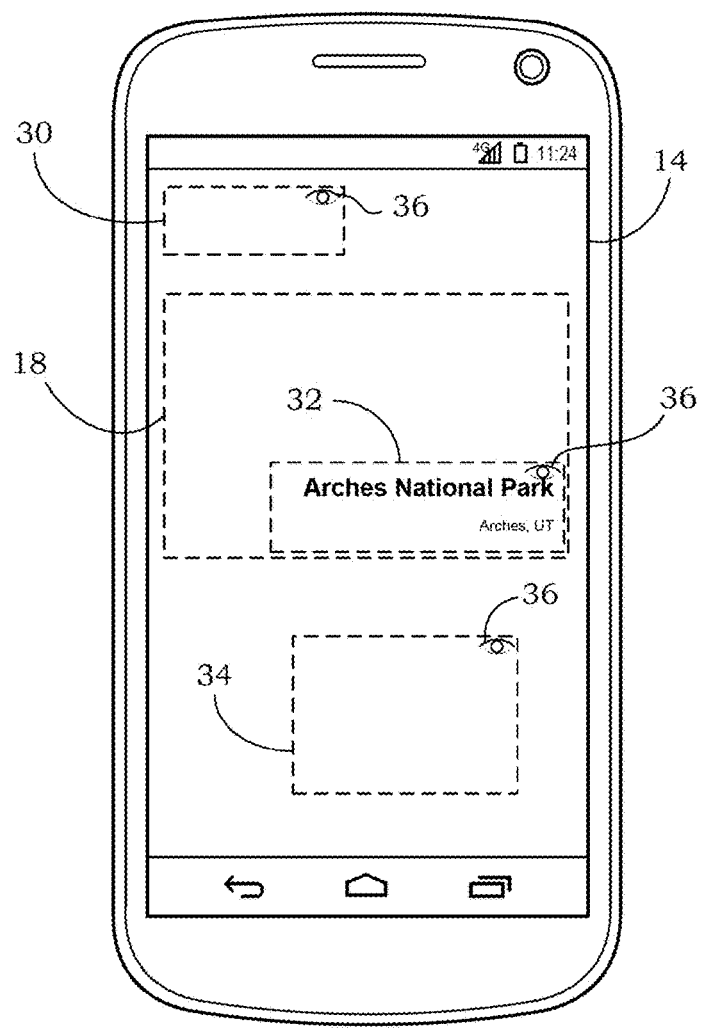
FIG. 3 schematically depicts the display screen shown in FIGS. 1 and 2 with gaze target areas, according to an embodiment of the present invention.

The present invention embraces user interfaces (UIs), display screens, touch screens, etc., which are incorporated into mobile devices such as cellular phones, smart phones, or other portable electronic devices. As mentioned above, there is limited screen real estate to present information to the user without cluttering the screen and providing a poor user experience.

The present invention describes embodiments of UIs having at least two visible display modes. The present invention may utilize the front-facing camera of the mobile device to detect the direction of gaze of the user. The direction of gaze can be used to determine what particular UI element the user is looking at. For the purpose of this disclosure, a UI element may refer to an element displayed on the UI, such as an image, a graphic, a button, a text box, a list box, a check box, etc.

To solve the limited screen real-estate problem, the present invention utilizes the user's gaze at a particular UI element to switch the UI from a regular display mode to a detailed display mode. For example, when a user looks at a particular UI element for more than a pre-defined amount of time, it can be determined that the user is interested in this particular element. Thus, the display mode will be "expanded" to the detailed display mode to show additional details and to dedicate more screen real estate to the interested element.

When the detailed display mode is shown and the front facing camera senses that the user looks somewhere else for a certain period of time, the UI is returned to its regular display mode. After switching back to the regular state, the present invention may also specify a configurable time period after the UI was switched back during which a glance at the interested UI element again will re-expand the display to its detailed display mode. This is to account for the scenario where a UI element is in its detailed state and the user briefly glances away from the device.

FIG. 1 illustrates an embodiment of a mobile device 10, which may be configured as a cellular phone, smart phone, or other type of portable electronic device having a user interface screen. The mobile device 10 includes a body 12 having a front side 12a and a back side (not shown). A display screen 14 and a front-facing camera 16 are both disposed on the front side 12a of the body 12 of the mobile device 10. The front-facing camera 16 is therefore directed generally toward the user of the mobile device 10 while the user views the display screen 14. In some embodiments, the mobile device 10 may also have a rear-facing camera (not shown) positioned on the back side of the body 12 of the mobile device 10, although the rear-facing camera is normally not utilized in the embodiments of the present invention.

The display screen 14 may be any type of device for providing visual information to the user. For example, the display screen 14 may include LED components, LCD components, and/or other suitable light components. In some embodiments, the display screen 14 may be a touchscreen that receives tactile input from a user. The display screen 14 may be part of a user interface including other input and/or output components such as buttons, switches, vibration components, etc.

As an example, FIG. 1 is shown with a user interface (UI) element 18 being displayed on the display screen 14. In this embodiment of FIG. 1, the display screen 14 displays the UI element 18 in a regular display mode. The regular display mode is a normal mode and includes a simple format for illustrating information (e.g., graphics and text) to a user. The regular display mode may be a simplified view of a graphics page (e.g., webpage, native application page, operating system window, etc.) without a large amount of extraneous information.

The UI element 18 may be any type of display element, such as an image, a graphic, a text box, a check box, etc. The UI element 18, as shown in the example of FIG. 1, is a picture of a famous arch (i.e., Delicate Arch) in Arches National Park in Utah.

The front-facing camera 16 may be configured to sense the eyes of the user as the user peruses the graphic or page that includes the UI element 18. An eye-gaze monitoring unit, which is described in more detail below, is incorporated in the mobile device 10 and is configured to determine the direction of the user's gaze from images captured by the front-facing camera 16. When the user gazes at the UI element 18 or a specific portion of the UI element 18, a control unit incorporated in the mobile device 10 changes the display screen 14 from the regular display mode to an expanded state or detailed display mode.

FIG. 2 shows the mobile device 10 of FIG. 1 when the display screen 14 presents content of the graphical page in the detailed display mode. This mode is displayed in response to the user gazing at the UI element 18 or a portion of the UI element 18. The UI element 18 may be "expanded" to include not only the original UI element 18 but also a supplemental information window 22 or other form for providing supplemental information related to the UI element 18. The display screen 14 is configured to continue displaying in the detailed display mode (with the supplemental information window 22) as long as the user continues to gaze at the UI element 18 or supplemental information window 22.

The expansion of the detailed display mode (FIG. 2) from the regular display mode (FIG. 1) may include any suitable type of transition processes. For example, the supplemental information window 22 may be displayed as a pop-up window superimposed over other non-selected UI elements. In other embodiments, the supplemental information window 22 may slide into place from any direction or expand from a single point. The transition may include other methods for showing the supplemental information window 22. Also, other types of windows besides the supplemental information window 22 may additionally or alternatively be displayed for illustrating supplemental information related to the UI element 18.

FIG. 3 illustrates the display screen 14 of the mobile device 10 of FIGS. 1 and 2, wherein gaze target areas 30, 32, and 34 are depicted. The gaze target areas 30, 32, and 34 are represented as dashed lines to indicate that they are not necessarily visible to the user. Instead, the gaze target areas 30, 32, and 34 may simply represent areas on the display screen 14 where the user's gaze to be perceived as an interest in a particular UI element.

Each gaze target area 30, 32, 34 may represent one or more UI elements. Therefore, when the user gazes on one particular gaze target area (e.g., gaze target area 32 representing "Arches National Park"), it can be determined that the user is interested in receiving more information about this UI element 18. At this point, the display screen 16 may be switched from the regular display mode (FIG. 1) to the detailed display mode (FIG. 2) to show the supplemental information about Arches National Park.

According to some embodiments, the display screen 14 may depict a graphical indicator 36 corresponding to each gaze target area 30, 32, 34. The graphical indicator 36 may be displayed for the user's benefit to indicate that the UI element 18 is gaze-enabled. In other words, the graphical indicator 36 shows the user that additional information is available if the user gazes at a particular gaze target area 30, 32, 34. The graphical indicator 36 may be shown as an "eye" symbol or as any other suitable image, symbol, word, letter, etc.

When the graphical indicators 36 are used with the gaze target areas, the graphical indicators 36 may be displayed at any position with respect to the gaze target areas 30, 32, 34. For example, graphical indicators 36 may be centered within the gaze target areas 30, 32, 34 or placed in a corner (e.g., the upper right-hand corner) of the respective gaze target area 30, 32, 34.

In this particular example of FIG. 3, the specific gaze target area 32 corresponding to the UI element 18 (i.e., the picture of the Delicate Arch) may include a size that is different from the size of the actual UI element 18. In this example, the gaze target area 32 is positioned where the text "Arches National Park/Arches, Utah" is displayed on the UI element 18.

The gaze target areas 30, 32, 34 may be similar to highlighted areas of a page where a user may select a path to a new page or to access additional information, such as by using a mouse cursor and button or by touching the element on a touchscreen device. However, instead of selection by positioning a cursor or by touching a screen, the present invention is responsive to the user directing his or her gaze at a particular element.

Figure 4:
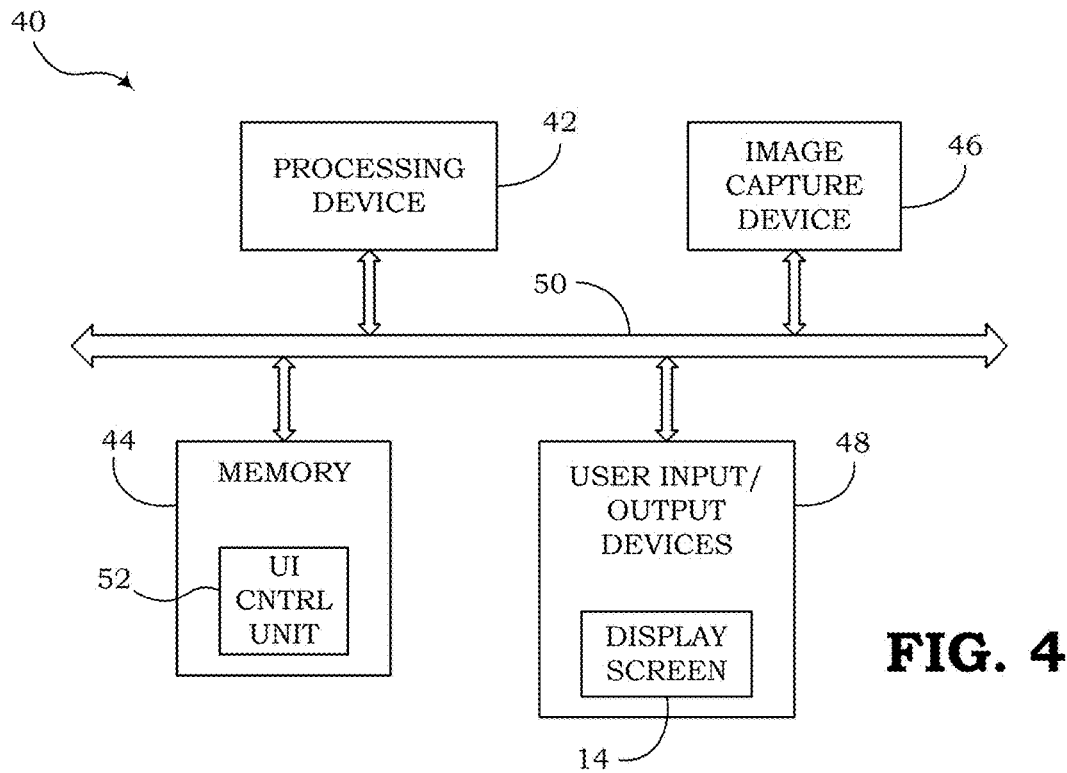
FIG. 4 schematically depicts a block diagram of a display control system incorporated in a mobile device, according to an embodiment of the present invention.

FIG. 4 is a block diagram illustrating an embodiment of a display control system 40 for controlling a display screen (e.g., display screen 14) of a mobile device (e.g., mobile device 10). The display control system 40 is configured to be contained within and/or mounted on the body 12 of the mobile device 10. In this embodiment of FIG. 4, the display control system 40 includes at least a processing device 42, a memory 44, an image capture device 46, and user input/output devices 48. For example, the display screen 14 shown in FIGS. 1-3 is one of many user input/output devices 48. The processing device 42, memory 44, image capture device 46, and user input/output devices 48 are interconnected and in communication with the other components via a bus interface 50.

The processing device 42 may comprise one or more processors, microprocessors, or other processing components for controlling the operations of the display control system 40 and may, in some embodiments, be configured to also control the overall operations of the mobile device 10. The memory 44 may contain any combination of volatile and non-volatile memory elements for electronically storing information, data, computational values, and/or software.

Computer programs and applications may be stored in the display control system 40 in software and/or firmware form. In other embodiments, the programs and applications may be contained at least partially in hardware form in the processing device 42. According to some embodiments, the memory 44 may contain a UI control unit 52 entirely in software and/or firmware. In other embodiments, the UI control unit 52 may be at least partially configured as hardware in the display control system 40. The processing device 42 executes the UI control unit 52 to perform the functions of controlling the images, graphics, text, etc. provided on the display screen 14. In particular, the UI control unit 52 enables the mobile device 10 to provide multiple display modes based on user intent as determined by eye-tracking characteristics.

In some embodiments, the display control system 40 may be manufactured with the mobile device 10. According to other embodiments, the UI control unit 52 may be uploaded into an existing mobile device 10 that already comprises a suitable processing device, memory, image capture device, and display screen. The UI control unit 52 may include software and/or firmware that is configured to operate with one or more of a plurality of different types of mobile devices. For example, certain programming operations may be compatible with an ANDROID brand phone platform while other programs, having similar functions as defined in the present disclosure, may be compatible with an APPLE brand phone platform.

Figure 5:
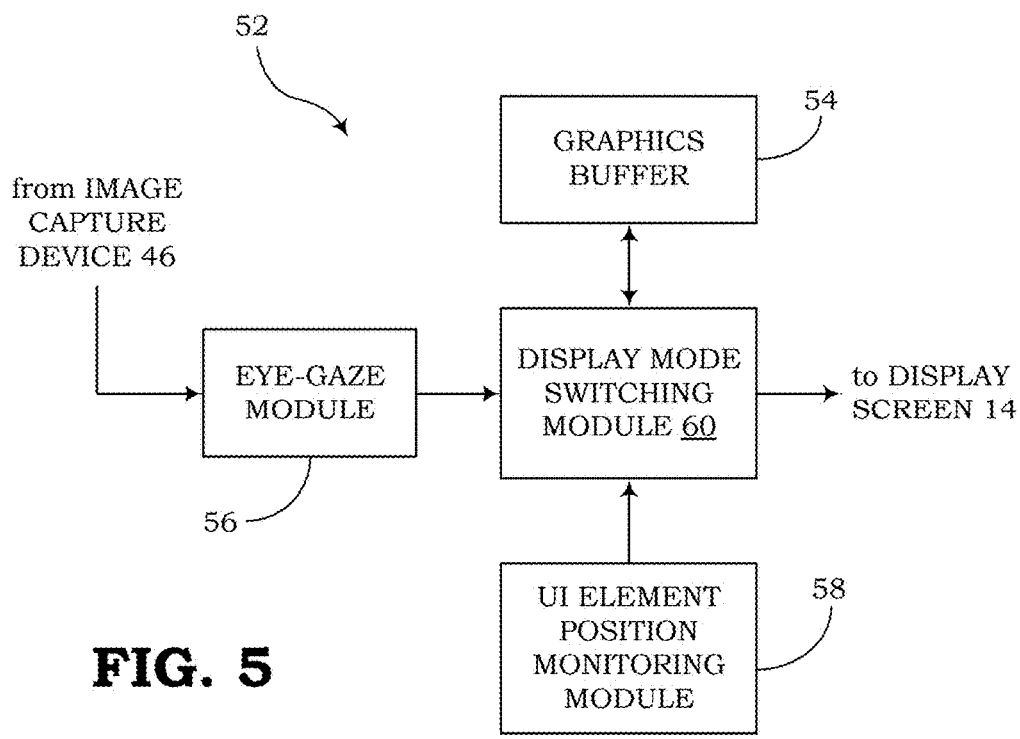
FIG. 5 schematically depicts a block diagram of the user interface control unit shown in FIG. 4, according to an embodiment of the present invention.

FIG. 5 is a block diagram illustrating an embodiment of the UI control unit 52 shown in FIG. 4. In this embodiment, the UI control unit 52 comprises a graphics buffer 54, an eye-gaze module 56, a UI element position monitoring module 58, and a display mode switching module 60. The graphics buffer 54 may include memory allocated to temporarily store elements that are displayed on the display screen 14 as well as other elements that may be displayed on the display screen 14 as dictated by the user's eye-gazing actions.

The eye-gaze module 56 may include any suitable processing components for receiving images of the user's eyes and processing the images to determine the direction of gaze of the eyes with respect to the display screen 14. Therefore, the eye-gaze module 56 is capable of determining where on the display screen 14 the user is focusing his or her gaze at any particular moment.

The UI element position monitoring module 58 is configured to monitor where the UI elements are positioned on the display screen 14 at any moment. Also, the UI element position monitoring module 58 may track the location of the gaze target areas 30, 32, 34 associated with the various UI elements.

The display mode switching module 60 is configured to receive information from both the eye-gaze module 56 and UI element position monitoring module 58. The display mode switching module 60 continuously processes this information to determine if the eye-gaze position coincides with one of the UI element positions. In other words, the display mode switching module 60 determines if the user is looking at a particular UI element. In addition to determining the overlap of eye-gaze and UI element positions, the display mode switching module 60 also tracks the time periods that the user's gaze is directed to the UI elements and the time periods when the user looks away.

According to a first scenario, the display screen 14 displays information in the regular display mode (FIG. 1). When the display mode switching module 60 determines that the user gazes at a particular UI element (e.g., UI element 18) or gaze target area (e.g., gaze target area 32) for a predetermined amount of time (e.g., about two seconds), the display mode switching module 60 switches from the regular display mode (FIG. 1) to the detailed display mode (FIG. 2).

A second scenario is analyzed when the display screen 14 is already in the detailed display mode resulting from an eye-gaze event described with respect to the first scenario. In the second scenario, the display mode switching module 60 determines whether or not the user's gaze is turned away from the UI element 18, gaze target area 32, or supplemental information window 22 for a predetermined amount of time (e.g., about two seconds). If so, the display mode switching module 60 switches back to the regular display mode (FIG. 1).

A third scenario involves a predetermined time period after the display mode switching module 60 switches the display screen 14 from the detailed display mode (FIG. 2) back to the regular display mode (FIG. 1) resulting from the user looking away from the UI element 18, gaze target area 32, or supplemental information window 22 as described with respect to the second scenario. The predetermined time period associated with the third scenario allows the display screen to return back to the detailed display mode if the user looks away for only a short amount of time. For example, if the user returns his or her gaze to the UI element 18, gaze target area 32, or supplemental information window 22 within the time period (e.g., about two seconds), the display mode switching module 60 switches immediately back to the detailed display mode (FIG. 2).

The predetermined time periods for each of the three scenarios may be about two seconds. However, in some embodiments, the time periods for each may be user-configurable to enable the user to customize how the display modes are enabled. For example, the times periods may be configurable to range from zero seconds (i.e., instantaneous) to 10 seconds or longer.

Depending on which mode the display mode switching module 60 has enabled, the UI elements and display elements (e.g., pictures, graphics, text, etc.) stored in the graphics buffer 54 are retrieved from the graphics buffer 54 and transmitted to the display screen 14. Therefore, the graphics buffer 54 may contain any combination of UI elements, supplemental information related to the UI elements, supplemental information windows, etc. The various display elements may be added or removed from the display screen according to the operations of the display control system 40.

In order to provide eye-gaze functionality and UI control functionality according to the teachings of the present disclosure, a certain platform (e.g., ANDROID brand) shall be selected. A subclass is created of all UI elements that the functionality will be applied to. The user interface controlling functionality of the mobile device 10 may be overridden to enable the UI control functionality disclosed herein. For example, the UI elements can be modified to enable the display of either the regular display mode (FIG. 1) or the detailed display mode (FIG. 2). The UI control unit 52 of FIG. 5 is able to switch to the detailed display mode when a user gazes at a particular UI element for a predefined period of time.

Eye-gazing functionality is utilized to control the features of a UI (e.g., an ANDROID brand UI). The programming may generally include a command that is used when a user gazes at a certain element. Instead of including a generic "Button" in the UI, a special type of button referred to herein as a "GazeButton" is included. The GazeButton has all the properties of a "Button" plus the additional gaze enabled functionality. A similar command can be used for any of the UI elements. In object-oriented programming, a class is an extensible program-code-template for creating objects, providing initial values for state (member variables) and implementations of behavior (member functions or methods).

When a class is extended, it becomes a derivative of that class and inherits all the properties of the class plus any alterations and/or additions of its own properties. Inheritance refers to a feature of Java and other programming languages. The class from which properties are inherited are referred to as a parent class, base class, or superclass. The class that inherits properties from the parent class is referred to as a child class, derived class, or subclass.

A subclass automatically takes on the behavior and attributes of its base class. In order to create several classes to describe types that are not identical but have many features in common, a base class can be created that defines all the common features. Then, subclasses can be created from the base class and can include modified or added features to distinguish itself from the base class. To create a subclass, the "extends" keyword is used to indicated the name of the base class, such as by the code:

```
public class ClassName extends BaseClass
{
    // class body defined here
}
```

Therefore, to create subclasses of UI elements that may be gaze-enabled (i.e., contain a supplemental information window 22 or other element to be displayed in the detailed display mode), the subclasses would be created from UI classes (e.g., ANDROID brand UI classes). The subclasses may then be modified as needed to include code to detect eye-gaze and render the detailed display mode of UI element. When no gaze is detected, the UI element would be rendered as its superclass is defined.

Utilizing the eye tracking functionality of the eye-gaze module 56, the eyes of the user can be monitored to determine where on the screen the user is looking. The display mode switching module 60 can analyze each UI element on any displayed page to see if they correspond to the eye tracking functionality to continually monitor if a position of a cursor represented by the user's eyes falls within the bounds of a corresponding UI element 18 or gaze target area 30, 32, 34 (FIG. 3). If the front-facing camera 16 and eye-gaze module 56 detect that the user's eyes are directed to the UI element 18 or gaze target area 30, 32, 34 for a predetermined amount of time (e.g., about two seconds), the UI control unit 52 switches to the detailed display mode.

When the front-facing camera 16 and eye-gaze module 52 detect that the user is no longer looking at the UI element 18 or the expanded display (i.e., the display including the supplemental information window 22), the UI control unit 52 is configured to return the user interface 48 back to the regular display mode or abbreviated state.

The UI control unit 52 may be provided as a downloadable application or software/firmware package. This would allow mobile devices to be upgraded to enable the user to interact with the UI to provide hands-free control of the UI. In addition to being hands-free, the UI display controller described in the present disclosure can provide a user experience that is directed to the intentions of the user as determined by the direction of gaze of the user and to avoid providing superfluous graphics that merely clutter the small screen of a mobile device. Therefore, the present invention overcomes the difficulties and issues that are typically inherent with display screens of most mobile devices.

To supplement the present disclosure, this application incorporates entirely by reference the following commonly assigned patents, patent application publications, and patent applications:
U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;

8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; U.S. Pat. No. D702,237;
U.S. Pat. Nos. 8,740,082; 8,740,085;
8,746,563; 8,750,445;
8,752,766; 8,756,059;
8,757,495; 8,760,563;
8,763,909; 8,777,108;
8,777,109; 8,779,898;
8,781,520; 8,783,573;
8,789,757; 8,789,758;
8,789,759; 8,794,520;
8,794,522; 8,794,525;
8,794,526; 8,798,367;
8,807,431; 8,807,432;
8,820,630; 8,822,848;
8,824,692; 8,824,696;
8,842,849; 8,844,822;
8,844,823; 8,849,019;
8,851,383; 8,854,633;
8,866,963; 8,868,421;
8,868,519; 8,868,802;
8,868,803; 8,870,074;
8,879,639; 8,880,426;
8,881,983; 8,881,987;
8,903,172; 8,908,995;
8,910,870; 8,910,875;
8,914,290; 8,914,788;
8,915,439; 8,915,444;
8,916,789; 8,918,250;
8,918,564; 8,925,818;
8,939,374; 8,942,480;
8,944,313; 8,944,327;
8,944,332; 8,950,678;
8,967,468; 8,971,346;
8,976,030; 8,976,368;
8,978,981; 8,978,983;
8,978,984; 8,985,456;
8,985,457; 8,985,459;
8,985,461; 8,988,578;
8,988,590; 8,991,704;
8,996,194; 8,996,384;
9,002,641; 9,007,368;
9,010,641; 9,015,513;
9,016,576; 9,022,288;
9,030,964; 9,033,240;
9,033,242; 9,036,054;
9,037,344; 9,038,911;
9,038,915; 9,047,098;
9,047,359; 9,047,420;
9,047,525; 9,047,531;
9,053,055; 9,053,378;
9,053,380; 9,058,526;
9,064,165; 9,064,167;
9,064,168; 9,064,254;
9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;

U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;

U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.); U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A mobile device comprising:
  a display screen disposed of the mobile device, the display screen configured to display a user interface element for a user of the mobile device;
  a camera disposed of the mobile device, the camera configured to sense a characteristic of an eye of the user;
  a processing device configured to process the characteristic of the eye of the user to determine a corresponding point on the display screen where the eye of the user is directed; and
  a user interface control unit configured to:
    switch the display screen from a regular display mode to a detailed display mode when the processing device determines that the corresponding point on the display screen where the eye of the user is directed coincides with the user interface element, wherein the user interface control unit is configured to switch the display screen from the regular display mode to the detailed display mode based on determination that the eye of the user is directed to a first point on the display screen coinciding with the user interface element for at least a predetermined period of time, wherein the detailed display mode includes supplemental information related to the user interface element,
    switch the display screen from the detailed display mode back to the regular display mode based on the determination that the eye of the user is directed to a second point no longer coinciding with the user interface element or supplemental information for at least the predetermined period of time, and in an instance, when the display screen is switched from the detailed display mode to the regular display mode, further switch the display screen back from the regular display mode to the detailed display mode if the processing device determines that the eye of the user is directed back to the first point in a time period within the predetermined period of time, wherein the time period is shorter than the predetermined period of time.

2. The mobile device of claim 1, wherein each of the user interface element is at least one of an image, a graphic, text, a text box, and a check box.

3. The mobile device of claim 1, wherein the display screen is configured to display a plurality of user interface elements simultaneously.

4. The mobile device of claim 1, wherein the regular display mode includes the user interface element in a simple format.

5. The mobile device of claim 4, wherein the detailed display mode includes the user interface element selected by the user in the simple format and the supplemental information related to the user interface element superimposed over other non-selected user interface elements displayed on the display screen.

6. The mobile device of claim 1, wherein the processing device is configured to determine whether or not the corresponding point on the display screen where the eye of the user is directed falls within a gaze target area, from amongst plurality of gaze target areas of the display screen, the gaze target area being associated with the user interface element.

7. The mobile device of claim 6, wherein the gaze target area is a different size compared to the user interface element.

8. The mobile device of claim 1, wherein the user interface control unit comprises a user interface element position monitoring module, a graphics buffer, and a display mode switching module.

9. The mobile device of claim 8, wherein the user interface element position monitoring module is configured to determine a position of the user interface element on the display screen.

10. The mobile device of claim 8, wherein the graphics buffer is configured to store the supplemental information related to the user interface element.

11. The mobile device of claim 1, wherein the user interface control unit is configured to display a graphical indicator associated with the user interface element to indicate to the user that the detailed display mode is available.

12. The mobile device of claim 1, further comprising a user input device configured to enable the user to set the predetermined period of time and the time period.

13. The mobile device of claim 1, wherein at least one of the predetermined period of time and the time period is user-configurable.

14. The mobile device of claim 1, wherein the user interface control unit is configured to display a graphical indicator associated with the user interface element to indicate to the user that the detailed display mode is available.

15. A mobile device comprising:
a body having a front side and a back side;
a display device disposed on the front side of the body, the display device configured to display user interface elements simultaneously, at least one of the user interface elements comprising at least one of an image element and a text element;
a camera disposed on the front side of the body, the camera configured to capture an image of an eye of a user when the user is viewing the display device; and
a user interface control unit configured to:
receive the image of the eye of the user from the camera;
determine a direction that the eye of the user is pointed;
determine a corresponding point on the display device where the eye of the user is directed; and
switch between a regular display mode and a detailed display mode based on whether the corresponding point on the display device where the eye of the user is directed coincides with one of a plurality of gaze target areas, wherein the user interface control unit is configured to control the display device to switch a display screen of the display device from a regular display mode to the detailed display mode based on determination that the eye of the user is directed to a first point on the display screen coinciding with a gaze target area of the plurality of gaze target areas for at least a predetermined period of time, wherein each gaze target area is associated with a respective user interface element,
switch the display screen from the detailed display mode back to the regular display mode based on the determination that the eye of the user is directed to a second point no longer coinciding with the gaze target area or another predetermined area for at least the predetermined period of time; and
in an instance, when the display screen is switched from the detailed display mode to the regular display mode, further switch the display screen back from the regular display mode to the detailed display mode based on a determination that the eye of the user is directed back to the first point in a time-period within the predetermined period of time, wherein the time-period is shorter than the predetermined period of time.

16. The mobile device of claim 15, wherein the detailed display mode includes a visually-selected user interface element and supplemental information related to the visually-selected user interface element superimposed over at least one other user interface element.

17. The mobile device of claim 15, wherein the user interface control unit comprises:
an eye-gaze module configured to determine a corresponding point on the display device where the eye of the user is directed;
a user interface element position monitoring module configured to determine a position of the gaze target areas on the display device;
a graphics buffer configured to store supplemental information related to the user interface elements; and
a display mode switching module configured to switch between the regular display mode and the detailed display mode based on input from the eye-gaze module and user interface element position monitoring module.

18. The mobile device of claim 15, wherein at least one of the predetermined period of time and the time-period is user-configurable.

19. The mobile device of claim 15, wherein the display device comprises plurality of gaze target areas and wherein the user interface control unit is configured to determine whether or not the corresponding point on the display device where the eye of the user is directed falls within a gaze target area, from amongst plurality of gaze target areas of the display device, the gaze target area being associated with one or more user interface elements.

20. A non-transitory computer-readable medium disposed in a mobile device storing an executable program being executable by a processing device disposed in the mobile device, the executable program comprising logic configured for:
- processing an image of an eye of a user of the mobile device to determine a corresponding point on a display screen of the mobile device where the eye of the user is directed;
- controlling visual features of the display screen based on whether or not the eye of the user is directed to a user interface element being displayed on the display screen, wherein controlling the visual features of the display screen comprises switching the display screen from a regular display mode to a detailed display mode when the eye of the user is directed to a first point on the display screen coinciding with the user interface element for at least a predetermined period of time, wherein the user interface element is an image element and/or a text element associated with supplemental information to be displayed in a detailed display mode;
- switching the display screen from the detailed display mode back to the regular display mode when the eye of the user is directed to a second point no longer coinciding with the user interface element or supplemental information for at least the predetermined period of time; and
- in an instance, when the display screen is switched from the detailed display mode to the regular display mode, further switching the display screen back from the regular display mode to the detailed display mode when the eye of the user is directed back to the first point in a time-period within the predetermined period of time, wherein the time-period is shorter than the predetermined period of time.

* * * * *